United States Patent [19]

Allcock et al.

[11] 4,412,066
[45] Oct. 25, 1983

[54] POLYMER BOUND DYES PREPARED BY DIAZO COUPLING REACTIONS WITH POLY(ORGANOPHOSPHAZENES)

[75] Inventors: Harry R. Allcock; Paul E. Austin, both of State College, Pa.

[73] Assignee: The United States of America as represented by the Department of Health and Human Services, Washington, D.C.

[21] Appl. No.: 389,118

[22] Filed: Jun. 16, 1982

Related U.S. Application Data

[63] Continuation-in-part of Ser. No. 379,877, May 19, 1982, abandoned.

[51] Int. Cl.³ .............................................. C08G 79/04
[52] U.S. Cl. .................................... 528/168; 525/535; 525/538; 528/167; 528/169; 528/399
[58] Field of Search ................................ 528/167–169, 528/399; 525/535, 538

[56] References Cited

U.S. PATENT DOCUMENTS 4,242,499 12/1980 Allcock et al. ...................... 528/399

OTHER PUBLICATIONS

Diazo Coupling Reactions with Poly(organophosphazenes), Allcock et al., *Macromolecules*, (1981).
Poly(organophosphazenes) with Chromophores as Substituent Groups, *Macromolecules*, vol. 11, pp. 357–359, Mar./Apr. 1978.

*Primary Examiner*—Lester L. Lee
*Attorney, Agent, or Firm*—John S. Roberts, Jr.

[57] ABSTRACT

Polymer-bound dyes have been prepared by the diazotization of high polymeric $[NP(OC_6H_5)_x\text{-}(OC_6H_4NH_2\text{-}p)_y]n$, followed by coupling to phenol, $\beta$-naphthol, 6'-$NaO_3S$-$\beta$-naphthol, and p-aminophenylnaphthalene. These reactions were preceded by model compound studies with the cyclic trimer $[NP(OC_6H_4NH_2\text{-}p\text{-})_2]_3$. In both cases, the aminophenoxy units were generated by reduction of 4-nitrophenoxy groups with the use of $PtO_2$ and hydrogen. The phosphazene skeleton was unaffected by the reduction, diazotization, and diazo coupling processes. The physical characteristics of the trimers and high polymers are described.

7 Claims, No Drawings

POLYMER BOUND DYES PREPARED BY DIAZO COUPLING REACTIONS WITH POLY(ORGANOPHOSPHAZENES)

The invention described herein was made in the course of work under a grant or award from the Department of Health and Human Services.

This is a continuation-in-part application of pending Ser. No. 379,877 filed May 19, 1982 and now abandoned.

Polymer-bound dyes have been prepared by the diazotization of high polymeric $[NP(OC_6H_5)_x(OC_6H_4NH_2\text{-}p)_y]_n$, followed by coupling to phenol, $\beta$-naphthol, $6'\text{-}NaO_3S\text{-}\beta$-naphthol, and p-aminophenylnaphthalene. These reactions were preceded by model compound studies with the cyclic trimer $[NP(OC_6H_4NH_2\text{-}p\text{-})_2]_3$. In both cases, the aminophenoxy units were generated by reduction of 4-nitrophenoxy groups with the use of $PtO_2$ and hydrogen. The phosphazene skeleton was unaffected by the reduction, diazotization, and diazo coupling processes. The physical characteristics of the trimers and high polymers are described.

Products of the present invention are immediately available in the photographic industry where the stable colors of the azo dyes are in broad demand. Also, as in medical research in animals, these same polymer dyes are of value because they are not absorbed in the gut. It is well known that macromolecules cannot pass through semi-permeable membranes. Thus, any species attached to a macromolecule will likewise be restrained from passing through semi-permeable membranes. This principle allows dyestuffs to pass through the gut without entering the tissues that line the intestinal tract.

PRIOR ART STATEMENT

Allcock, "Phosphonitrilic Polymers," *Encyclopedia of Polymer Science and Technology*, Vol. 10, pp. 139–144.

Allcock et al, "Poly(organophosphazenes) with Chromophores as Substituent Groups," *Macromolecules*, Vol. 11, pp 357–359, March/April 1978. The abstract properly points out that bulky chromophoric groups such as 1-phenylazonaphthalene-2-oxy (R'O) and p-phenylazoanilino (R''—NH), have been bound covalently to a polyphosphazene chain by the reaction of the sodium salt of 1-phenylazo-2-naphthol or p-phenylazoaniline with poly(dichlorophosphazene). The difference is apparent in the handling of the reaction at the azo group and this article it is believed represents the closest prior art. Allcock et al, "Diazo Coupling Reactions with Poly(organophosphazenes)," *Macromolecules*, 14:1622–1625 (1981).

U.S. Pat. No. 4,242,499 Allcock et al.

THE INVENTION

Previous attempts to link preformed chromophores to a phosphazene chain suffered from steric hindrance and ligand displacement problems which, together, allowed the introduction of relatively few chromophoric units per chain.

In the present invention, polyphosphazenes that contain both phenoxy and 4-nitrophenoxy side groups have been used, with the latter being used as sites for chromophore construction. Because of the usual problems involved in the molecular characterization of new high polymers, the high-polymeric reactions were preceded by a series of model compound studies with small-molecule cyclotriphosphazenes in order first to optimize the synthetic and characterization procedures.

Model compound studies. The overall reaction sequence for the model compound studies is outlined in Scheme I below. Thus, hexachlorocyclotriphosphazene (1) reacted with sodium 4-nitrophenoxide to yield hexakis(4-nitrophenoxy)cyclotriphosphazene (2), which could be reduced catalytically to hexakis(4-aminophenoxy)cyclotriphosphazene (3). No evidence of catalyst poisoning by the phosphazene was found, and this was important for the later polymer synthesis. Compound 3 was converted to the diazonium salt 4 under standard reaction conditions and without any evidence of phosphazene skeletal cleavage. Subsequent coupling of the diazonium salt to four representative aromatic units yielded 5–9.

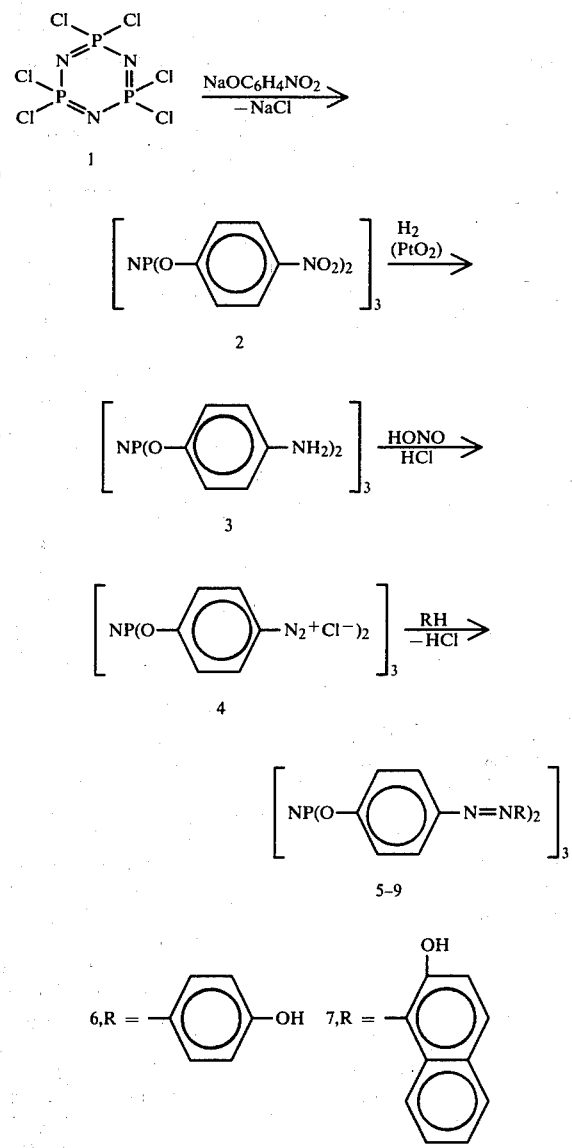

Scheme I

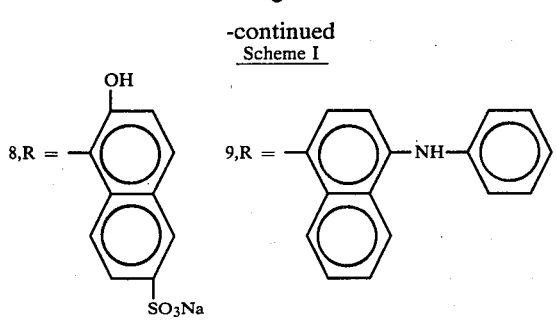

-continued
Scheme I

These model compounds were characterized by a variety of techniques. First, the strong characteristic colors of 5–9 were indicative of azo compound formation. Ultraviolet-visible absorptions were detected at the following wave lengths: 6, 348 nm; 7, 330 and 370 nm; and 8, 325 and 342 nm. Species 9 can exist in either a protonated (cyanine type) or unprotonated form which yields either a purpose color ($\lambda_{max}$ 574 nm) in acidic solution or an orange color ($\lambda_{max}$ 347 nm) in basic media. Elemental analysis, $^{31}$P NMR, $^1$H NMR, melting point, and mass spectrometric data are listed in Table I. All these data are compatible with structures 5–9, and this suggested that analogous polymeric reactions might be feasible.

However, during the course of this investigation it became apparent that this side reaction did not occur to a detectable extent. Cross-linking of 14 did not occur under the reaction conditions employed. Moreover, it was found that neither poly(diphenoxyphosphazene), [NP(OC$_6$H$_5$)$_2$]$_n$, nor hexaphenoxycyclotriphosphazene, [NP(OC$_6$H$_5$)$_2$]$_3$, underwent coupling reactions with phenyldiazonium chloride or (4-methylphenyl)-diazonium chloride. Hence, a phenoxy group linked to the phosphazene skeleton is apparently inactive to diazo coupling processes.

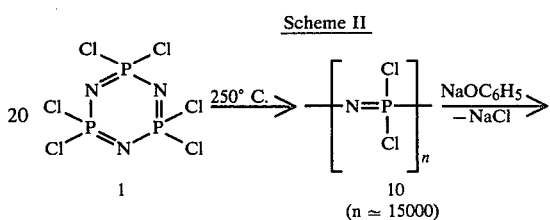

TABLE I

| Compound | | Analysis | | | | $^{31}$P NMR,[a] | mp, °C. | MW[b] |
|---|---|---|---|---|---|---|---|---|
| | | % C | % H | % N | % P | ppm | | |
| 2 | calcd | 44.85 | 2.49 | 13.08 | 9.68 | 6.9 | 264 | 963 |
| | found | 44.96 | 2.51 | 12.93 | 9.80 | | | 963 |
| 3 | calcd | 55.17 | 4.63 | 16.11 | 11.80 | 11.26 | 189 | 783 |
| | found | 54.97 | 4.58 | 15.88 | 12.08 | | | 783 |
| 6 | calcd | 61.14 | 3.82 | 14.86 | | 10.20 | 170 (dec) | 1413 |
| | found | 61.13 | 3.85 | 14.65 | | | | 1413 |
| 7 | calcd | 67.25 | 3.88 | 12.25 | | 10.72 | 140 (dec) | 1713 |
| | found | 67.25 | 3.96 | 12.45 | | | | [c] |
| 8 | calcd | 49.54 | 2.58 | 9.00 | | 10.70 | 305 (dec) | 2325 |
| | found | 51.45 | 2.91 | 9.16 | | | | [c] |
| 9 | calcd | 73.23 | 4.43 | 13.60 | | 10.70 | 160 | 2163 |
| | found | 72.34 | 4.77 | 14.12 | | | | [c] |

[a] The $^1$H NMR spectrum of 3 showed NH$_2$ protons at 3.5 ppm and aromatic protons centered at 6.8 ppm in a ratio of 1:2.
[b] Mass spectral parent ion.
[c] The mass of the parent ion was too high to be detected.

Synthesis of the Polymers. In view of the steric hindrance inherent in side groups such as those in 6–9 and the insolubility of the high-polymeric analogue of 2, the diazo construction sequence was carried out not on the open-chain polymeric analogue of 2 but on a mixed-substituent polymer containing approximately 67% phenoxy and 33% 4-nitrophenoxy side groups. The reaction sequence is shown in Scheme II.

Hexachlorocyclotriphosphazene (1) was polymerized thermally to poly(dichlorophosphazene)(10). The phenoxy substituent groups were introduced first to form 11 because of the known ease with which nitrophenoxy groups can be displaced by a second nucleophile. Subsequent treatment of 11 with an excess of sodium 4-nitrophenoxide yielded 12. Catalytic reduction of 12 to 13 was accomplished with the same techniques as those used for the cyclic oligomeric model, and subsequent treatment with nitrous acid yielded the diazonium halide 14. Coupling to the aromatic hydroxy compound or amine was then accomplished as before to yield 15–19.

An anticipated problem with this synthesis route was the possibility that the diazonium halide (14) might undergo intra- or intermolecular diazo coupling with the phenoxy groups attached to the phosphazene chain.

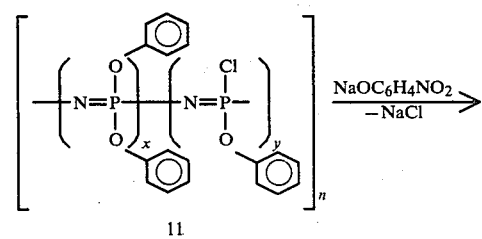

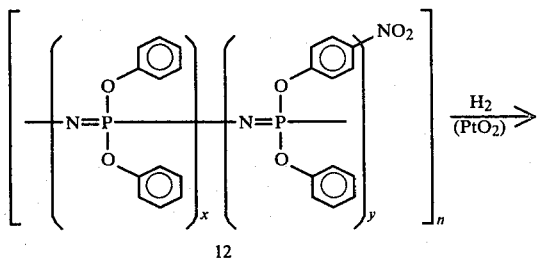

-continued
Scheme II red ($\lambda_{max}$ 338 nm), 18 was orange ($\lambda_{max}$ 438 nm), and 19 was purple in acidic media ($\lambda_{max}$ 570 nm) and orange in base ($\lambda_{max}$ 344 nm).

TABLE II

| Compound | | Analysis | | | GPC MW | UV max, nm | $T_g$, °C. | $^{31}$P NMR, ppm |
|---|---|---|---|---|---|---|---|---|
| | | % C | % H | % N | | | | |
| 12 | calcd | 55.23 | 3.58 | 8.91 | $5 \times 10^5$ | | 0 | −16/−20 |
| | found | 55.04 | 3.68 | 8.68 | | | | |
| 13 | calcd | 59.75 | 4.42 | 9.68 | $5 \times 10^5$ | | 27 | −8/−20 |
| | found | 61.54 | 5.16 | 10.21 | | | | |
| 16 | calcd | 61.73 | 4.07 | 10.50 | $5 \times 10^5$ | 442 | 50 | −15/−20 |
| | found | 60.21 | 4.50 | 10.18 | | | | |
| 17 | calcd | 65.05 | 4.06 | 9.48 | $5 \times 10^5$ | 338 | 25 | −16/−20 |
| | found | 64.92 | 3.36 | 9.49 | | | | |
| 18 | calcd | 54.32 | 3.23 | 7.92 | $5 \times 10^5$ | 438 | 24 | −16/−20 |
| | found | 54.16 | 3.04 | 7.19 | | | | |
| 19 | calcd | 68.97 | 4.39 | 10.65 | $5 \times 10^5$ | 570/344 | 28 | −16/−20 |
| | found | 67.53 | 4.70 | 10.40 | | | | |

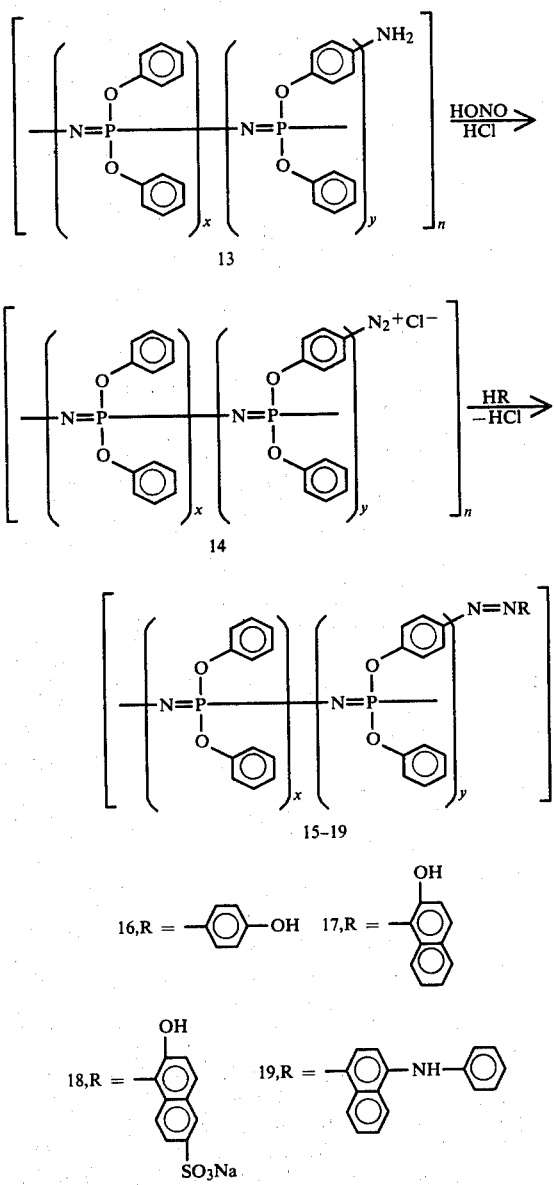

Characterization of the Polymers. The characterization data are summarized in Table II. The generation of intense colors following the diazo coupling step provided a firm indication for the formation of 15. Specifically, 16 yielded a yellow color ($\lambda_{max}$ 442 nm), 17 was

EXAMPLES

Materials. Hexachlorocyclotriphosphazene (1), provided by Ethyl Corp., was purified by sublimation at 50° C. (0.5 torr) for 48 h, recrystallized twice from hot n-hexane, and resublimed once. Samples for polymerization (~200 g) were sealed in evacuated Pyrex tubes. N-henyl-1-aminonaphthalene (Aldrich) was recrystallized once from hot tetrahydrofuran. Phenol, β-naphthol, and 6'-NaSO$_3$-β-naphthol (Aldrich) were used as received. Tetrahydrofuran (THF) was boiled at reflux over benzophenone-sodium before use. 4-Nitrophenol (Aldrich) was recrystallized once from hot ethanol. PtO$_2$ and sodium hydride (Aldrich) were used as received. Dioxane (Baker) was dried over benzopyhenone-sodium before use. Sodium hydride (Aldrich, 50% dispersion in oil) was washed with distilled n-hexane before use.

Analytical Equipment. Gel permeation chromatography (GPC) analysis was carried out with a Waters Associates ALC-201 instrument. A 132 cm×1 cm 10$^5$ Styragel column was used with a THF solvent flow rate of 2.4 mL/min and samples injected at a concentration of 0.5 wt vol %. A refractive index detector was used. Approximate calibration of the columns was accomplished by means of narrow molecular weight polystyrene standards obtained from Waters Associates together with the use of molecular weight data for other polyphosphazenes. The physical properties of the polymers were monitored by torsional braid analysis with a modified Chemical Instruments Corp. unit.

EXAMPLE 1

Synthesis of Hexakis(4-nitrophenoxy)cyclotriphosphazene (2)

The sodium salt of 4-nitrophenol was prepared with the use of sodium hydride in THF solution under a nitrogen atmosphere for 1 h. The solution changed from brown to bright orange as the salt formed. A solution of sodium 4-nitrophenoxide (172.2 g, 1.07 mol) in THF (300 mL) was added via an addition funnel with a positive nitrogen pressure into a reaction vessel which contained a stirred solution of hexachlorocyclotriphosphazene (1) (60 g, 0.172 mol) in THF (200 mL) under a dry nitrogen atmosphere. The addition took place during 1 h. The reaction mixture was refluxed for 72 h. The insoluble product was collected by suction filtration, and the filter cake was washed with water (2000 mL), ethanol (2000 mL), and pentane (1000 mL). Recrystallization from o-dichlorobenzene yielded 134 g (81%) of 2; mp 261°-264° C. A $^{31}$P NMR spectrum in THF showed a singlet at 6.9 ppm.

EXAMPLE 2

Synthesis of Hexakis(4-aminophenoxy)cyclotriphosphazene (3)

A 1000-mL stirrer-equipped autoclave was charged with 40.0 g (0.041 mol) of hexakis(4-nitrophenoxy)cyclotriphosphazene (2), aniline (75 mL), and 0.1 g of PtO$_2$ catalyst. The mixture was agitated vigorously under 50 psi of hydrogen pressure at 50° C. until no further pressure drop was recorded (~30 h). The reaction mixture was filtered and the filtrate was poured slowly into toluene (1000 mL). Impure 3 precipitated from solution. After filtration, the crude 3 was recrystallized from o-dichlorobenzene and from THF to yield 30 g (92%) of pure 3, mp 189°-190° C. A $^{31}$P NMR spectrum in THF showed a singlet at 11.2 ppm, which indicated complete conversion of NO$_2$ to NH$_2$ groups.

EXAMPLE 3

Synthesis of 7

All diazotization reactions were carried out in an identical manner, and one representative description of the method will be given. Hexakis(4-aminophenoxy)cyclotriphosphazene (3) (2 g, 0.0025 mol) was dissolved in water (35 mL) containing 9.19 mL of 5 N HCl. The clear solution was cooled to 0° C. in an ice bath. To this solution was added dropwise NaNO$_2$ (1.16 g, 0.0016 mol) dissolved in water (10 mL) at 0° C. The addition took place at a rate that maintained the temperature of the mixture below 2° C. at all times. This mixture was stirred for 1 h at 0° C. β-Naphthol (5 g, 0.0347 mol) dissolved in aqueous NaOH (1.4 g, 0.035 mol) was added dropwise. The addition was accomplished quickly, but at no time was the temperature permitted to rise above 2° C. Following the addition of β-naphthol, the solution became bright red and a red precipitate formed. The mixture was stirred for 6 h at 0° C., after which time the precipitate was collected by suction filtration. The red solid was washed with water (50 mL) and ethanol (50 mL). It was then recrystallized from hot ethanol and dried under vacuum at 50° C. for 6 h. Prolonged heating in excess of 90° C. may lead to the decomposition of the diazo linkage. Yield 3.2 g (75%). The $^{31}$P NMR spectrum consisted of a singlet at 10.72 ppm. Mp 140° C. (dec).

EXAMPLE 4

Synthesis of Poly(dichlorophosphazene)(10)

Polymerization of (NPCl$_2$)$_3$ (1) was carried out in degassed, sealed glass tubes, each containing about 200 g of purified 1. The sealed tubes were heated in a Freas Model 104 thermoregulated oven at 250° C. for 120 h. The tubes were agitated during polymerization so that a rocking motion was completed about once each minute. After completion of the polymerization, residual cyclic trimer was removed by vacuum sublimation at 55° C. (0.7 torr). To reduce differences in the poly(dichlorophosphazene) samples used in the various substitution reactions, a number of polymerization tubes were simultaneously filled with trimer from one uniform batch, evacuated, and sealed. These tubes were stored in the dark and were polymerized as needed, using the same time and temperature.

EXAMPLE 5

Synthesis of Poly(33% 4-nitrophenoxy/67% phenoxy)phosphazene (12)

The sodium salt of phenol was prepared with the use of sodium hydride in dioxane solution, initially under a nitrogen atmosphere for 1 h. A solution of sodium phenoxide (29.9 g, 0.258 mol) in dioxane (300 mL) was added via an addition funnel, with a positive nitrogen pressure into a reaction vessel which contained a stirred solution of poly(dichlorophosphazene)(10) (20.0 g, 0.17 mol) in dioxane (1100 mL) under a dry nitrogen atmosphere. The addition took place over a 2-h period. The mixture was stirred for 96 h at reflux temperature and a solution of sodium 4-nitrophenoxy (27.7 g, 0.17 mol) in dioxane (300 mL) was then added over a period of 2 h. This mixture was stirred for an additional 24 h at reflux temperature. The polymer was recovered by partial removal of the solvent at reduced pressure and by precipitation into n-heptane (1000 mL). The polymer was purified by reprecipitation twice from THF into water, once into ethanol, and twice into n-heptane; yield 29.2 g (68%). Infrared analysis confirmed the pressence of a broad P=N "stretching" band centered near 1200 cm$^{-1}$.

EXAMPLE 6

Synthesis of Poly(33% 4-aminophenoxy/67%phenoxy)phosphazene (13)

A 1000-mL autoclave was charged with 25 g of 12, aniline (500 mL), and 0.1 g of PtO$_2$ catalyst. The mixture was agitated vigorously and was hydrogenated under 50 psi of hydrogen pressure at 50° C. until no further pressure drop was recorded (~40 h). The reaction mixture was filtered, and the filtrate was added dropwise to ethanol (2000 mL). Impure 13 precipitated from solution. After filtration, the crude 13 was reprecipitated twice from THF into water (2000 mL), once from THF into ethanol (1000 mL), and once from THF into n-heptane (1000 mL). In orer to remove any remaining traces of aniline, the polymeric material was extracted thoroughly (96 h in a Soxhlet apparatus) with ethanol; yield 21.1 g (89%) of a white polymeric material. $^{31}$P NMR analysis suggested a 33% 4-aminophenoxy-67% phenoxy side-group composition, with no evidence of residual 4-nitrophenoxy groups. Infrared analysis confirmed the presence of a P—N "stretching" band centered around 1200 cm$^{-1}$. The amino functionalities were detected from bands centered around 3500-3200 cm$^{-1}$ (see Table II above).

EXAMPLE 7 CSynthesis of 17

The polymeric diazotization reactions were carried out in similar manner, and the following procedure is typical. Poly(33% 4-aminophenoxy/67% phenoxy)phosphazene (13) (2 g) was dissolved in THF (35 mL) containing 1.65 mL of 10 N HCl. The clear solution was cooled to 0° C. in an ice bath. To this solution was added dropwise NaNO$_2$ (0.79 g, 0.011 mol) in water (20 mL) at 0° C. The addition took place at a rate which kept the reaction temperature below 2° C. at all times. No precipitation of the polymer took place. This mixture was stirred for 1 h at 0° C. β-Naphthol (1.59 g, 0.0109 mol) dissolved in aqueous NaOH (0.44 g, 0.011 mol) was then added dropwise. The addition was accomplished quickly, but at no time was the temperature permitted to rise above 2° C. Following addition of the β-naphthol, the solution changed from colorless to orange. The mixture was stirred for an additional 2 h, after which time the solution was filtered and the filtrate was precipitated dropwise into ethanol (500 mL). The orange-colored polymeric solid was collected and purified by reprecipitation from THF into ehtanol and twice from THF into n-pentane. All the polymeric diazotization coupling products were extracted with ethanol for 96 h by means of Soxhlet apparatus before drying under vacuum at 50° C. for 8 h; yields 2.0 g (76%). Additional characterization data for this and the other products are listed in Table II above.

We claim:

1. A polymer-bound dye prepared by diazotization of a high polymeric polyorganophosphazine $[NP(OC_6H_5)_x(OC_6H_4NH_2\text{-}p)_y]_n$, at about 0° C. in mineral acid solution by addition of alkali metal nitrite in acid solution followed by the addition of a coupling member in alkaline solution at a temperature not greater than about 2° C. to one member of the group consisting of phenol, β-naphthol, 6'-$NaO_3S$-β-naphthol, and p-aminophenylnaphthalene.

2. The polymer-bound dye according to claim 1 wherein the member is phenol.

3. The polymer-bound dye according to claim 1 wherein the member is β-naphthol.

4. The polymer-bound dye according to claim 1 wherein the member is 6'-$NaO_3S$-β-naphthol.

5. The polymer-bound dye according to claim 1 wherein the member is p-aminophenylnaphthalene.

6. The polymer-bound dye according to claim 1 wherein the reaction proceeded from a cyclic trimer $[NP(OC_6H_4NH_2\text{-}p)_2]_3$.

7. A polymer-bound dye according to claim 1 wherein the coupling member is utilized in about equimolar quantities to the sodium nitrite.

* * * * *